(No Model.)

I. LEWIS.
CIGAR CRIMPING AND STAMPING MACHINE.

No. 511,960. Patented Jan. 2, 1894.

Attest:
A. N. Jesbera
A. Kidder

Inventor:
Israel Lewis
by William B. Greeley
Att'y.

UNITED STATES PATENT OFFICE.

ISRAEL LEWIS, OF NEW YORK, N. Y.

CIGAR CRIMPING AND STAMPING MACHINE.

SPECIFICATION forming part of Letters Patent No. 511,960, dated January 2, 1894.

Application filed February 10, 1893. Serial No. 461,787. (No model.)

*To all whom it may concern:*

Be it known that I, ISRAEL LEWIS, of the city, county, and State of New York, have invented a new and useful Improvement in Cigar Crimping and Stamping Machines; and I do hereby declare that the following is a full and exact description thereof, reference being had to the accompanying drawings, and to the letters of reference marked thereon, making a part of this specification.

The object of my invention is to produce a simple and inexpensive machine which can be used for stamping marks upon cigars or for compressing or crimping their ends so that various shapes with small ends, such, for example, as what is known as the "perfecto" shape, can be produced from cigars which have been rolled or formed of the same diameter at the end as in the middle.

By the use of my machine it is possible to save much time in the manufacture of cigars of the shapes referred to, as well as to avoid the waste of the finest portion of the leaf which is cut away in giving the proper shape to the wrapper in order that it may be applied properly to the cigar.

Figure 1:
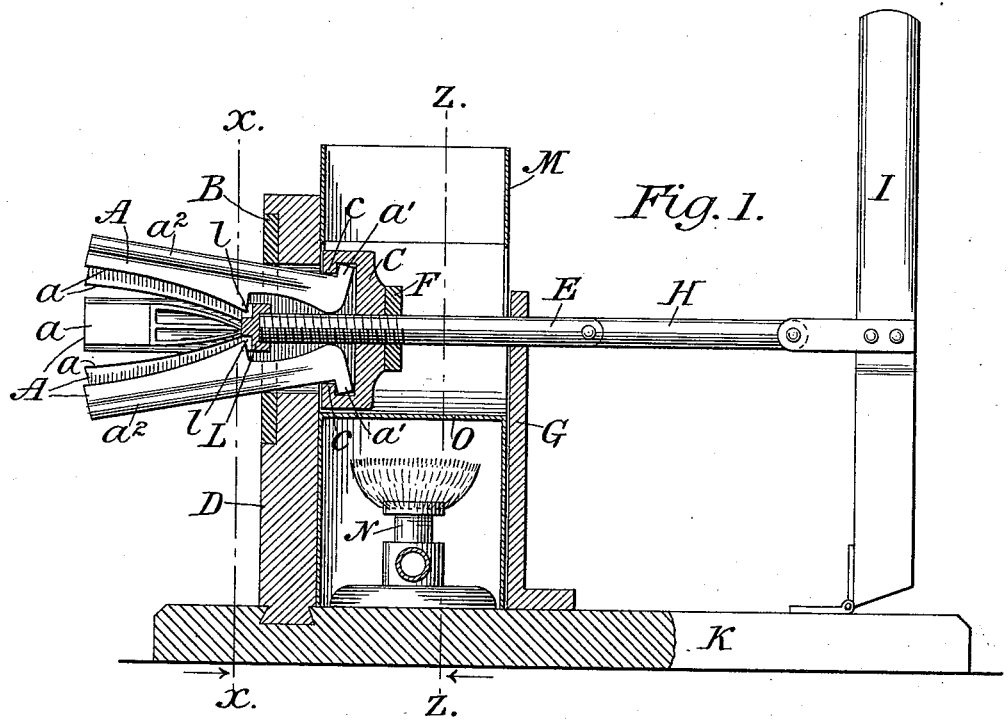
Figure 2:
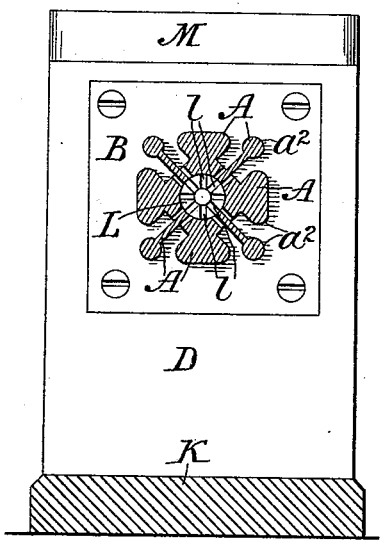
Figure 3:
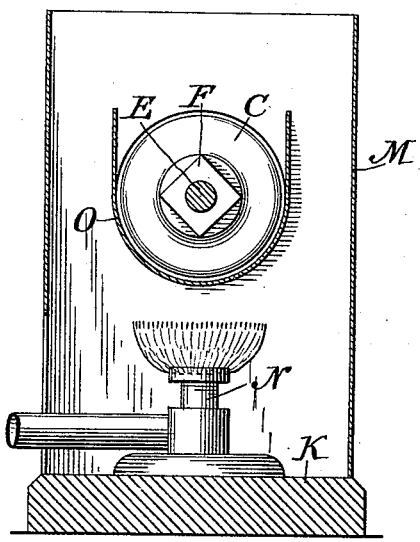

In the drawings: Figure 1 is a view, partly in elevation and partly in central section, of a machine which embodies my invention. Fig. 2 is a section on the line $x-x$ of Fig. 1, looking toward the right. Fig. 3 is a section on the line $z-z$ of Fig. 1, looking toward the left.

The machine comprises essentially a series of blades A, A, which are arranged about a common center and are movable radially toward and from the center, an encircling plate B to compress the blades upon a cigar which is placed between them, and a means to move the series of blades longitudinally with respect to the plate or vice versa. The blades A, A, may have their inner edges $a$, $a$, broad or narrow according as it is desired to imprint upon the cigar a mark which is formed upon a broad face, or merely to crimp or corrugate the cigar, and the edges may be variously shaped according to the particular shape which it is desired to give to the end of the cigar. The ends of the blades, as at $a'$, are preferably formed to engage, as by a hinge joint, with a head C, which has an inwardly turned flange or lip $c$, for this purpose. The plate B is firmly supported in a suitable holder D and is formed to engage the ribbed backs $a^2$ of the blades so that when the relative position of the blades and plate is changed the blades will be spread apart to permit a cigar to be placed between them or to be removed, while a corresponding change of position in the opposite direction will force the blades together about the cigar. I have shown the blades as adapted to be spread apart by the plate B, but it is evident that it might be effected by other means not herein shown.

It is obviously immaterial whether the head C with its attached blades be moved with respect to a fixed plate B, or vice versa, but I have shown the former as the preferred arrangement. To this end I have shown the head C as secured to a longitudinal movable rod or shaft E, being preferably screwed thereon and fixed in position by a lock-nut F. The shaft is supported by a guide-plate G and is connected by a link H to a hand lever I, which is pivoted to the base K in the machine. If it is desired to run the machine by power rather than by hand the link H might be connected to a crank in place of the lever I. Preferably the inner end of the rod or shaft E carries a boss L which is formed with radial slots $l$, $l$, to receive and steady the inner edges of the blades A, A.

In the use of my machine the blades A, A, are selected with a view to the work to be performed. Thus, if cigars are to be stamped on the body with certain marks the blades will have the desired marks formed on their inner faces and will be so shaped as to touch the cigar at no other point when closed upon it. If the cigar end is to be crimped the blades will be formed like the narrow blades shown in section in Fig. 2. The blades shown in Figs. 1 and 2 are adapted to stamp, compress, and crimp a cigar at one operation.

The cigar to be operated on having been placed centrally between the blades the hand lever I is thrown to the right in Fig. 1. This movement causes the blades to be drawn farther into or through the plate B and therefore to be forced together about the cigar. A movement of the hand lever in the opposite direction spreads the blades and releases the cigar. It is desirable that the blades should be kept at a moderate heat and for this purpose I have provided a jacket M to inclose a burner N and the head C with the inner ends of the blades. A shield O is placed directly beneath the head C to prevent the heat from impinging directly thereon.

As stated above the use of my machine makes it possible to avoid the waste of that part of the leaf which is usually cut away in shaping a wrapper, for by simply extending the binder and the wrapper, which is cut as though for a straight cigar, somewhat beyond the filler, the lighting end of the cigar can be crimped and shaped by the machine to the desired form.

I claim as my invention—

1. In a machine for compressing cigars, the combination of a series of rigid crimping or stamping blades for indenting the surface of the cigar, having ribbed backs and arranged about a common center and movable radially, a longitudinally movable head, to which said blades are pivotally attached, means for operating said head, and a plate or ring encircling the blades and formed to engage the ribbed backs whereby in the movement of the head, the blades are forced upon the cigar; substantially as described.

2. In a machine for compressing cigars, the combination of a series of crimping or stamping blades for indenting the surface of the cigar arranged about a common center and movable radially, a longitudinally movable head to which said blades are attached, a rod to which said head is secured, means for operating said rod, and means surrounding said series of blades whereby in the movement of the rod and head said blades are forced upon the cigar; substantially as described.

3. In a machine for compressing cigars, the combination of a series of crimping or stamping blades for indenting the surface of the cigar arranged about a common center and movable radially, a head to which the blades are attached, a rod to which the head is secured, said rod having a boss L with radial slots in which the inner edges of the blades are supported, and means surrounding said blades whereby they may be forced upon the cigar; substantially as described.

4. In a machine for compressing cigars, the combination of a series of crimping or stamping blades for indenting the surface of the cigar arranged about a common center and movable radially, a longitudinally movable head to which said blades are attached, an adjustable rod to which said head is secured, means for operating said rod, and means surrounding said series of blades whereby in the movement of the rod and head said blades are forced upon the cigar; substantially as described.

5. In a machine for compressing cigars, the combination of a series of crimping or stamping blades for indenting the surface of the cigar arranged about a common center and movable radially, a longitudinally movable head to which said blades are attached, an adjustable rod to which said head is secured, means for operating said rod, and means surrounding said series of blades whereby in the movement of the rod and head said blades are forced upon the cigar; said rod to which the head is attached having the boss L with radial slots, the inner edges of the blades being supported in said slots; substantially as described.

6. In a machine for compressing cigars, the combination of a series of crimping or stamping blades for indenting the surface of the cigar arranged about a common center and movable radially, a movable head C having an inwardly turned lip or flange c in which the inner ends of the blades fit, a rod to which the head is secured having a boss on which the edges of the blades are pivoted, means for operating said head, and means surrounding said blades whereby they may be forced upon the cigar in the movement of the rod; substantially as described.

In testimony whereof I have signed my name to this specification in the presence of two subscribing witnesses.

ISRAEL LEWIS.

Witnesses:
A. N. JESBERA,
A. WIDDER.